United States Patent
Chen

(10) Patent No.: US 12,259,823 B2
(45) Date of Patent: Mar. 25, 2025

(54) VIRTUAL MEMORY MANAGEMENT METHOD AND APPARATUS SUPPORTING PHYSICAL ADDRESSES LARGER THAN VIRTUAL ADDRESSES

(71) Applicant: Beijing ESWIN Computing Technology Co., Ltd., Beijing (CN)

(72) Inventor: Weijie Chen, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 213 days.

(21) Appl. No.: 18/078,539

(22) Filed: Dec. 9, 2022

(65) Prior Publication Data

US 2023/0289295 A1    Sep. 14, 2023

(30) Foreign Application Priority Data

Dec. 10, 2021    (CN) .......................... 202111509239.8

(51) Int. Cl.
G06F 12/1009    (2016.01)
G06F 12/1027    (2016.01)

(52) U.S. Cl.
CPC ...... G06F 12/1009 (2013.01); G06F 12/1027 (2013.01); G06F 2212/657 (2013.01)

(58) Field of Classification Search
None
See application file for complete search history.

(56) References Cited

U.S. PATENT DOCUMENTS

| | | | | |
|---|---|---|---|---|
| 5,577,231 A * | 11/1996 | Scalzi | ................ | G06F 9/45537 711/206 |
| 6,026,476 A * | 2/2000 | Rosen | ................ | G06F 12/1027 711/205 |
| 7,343,469 B1 * | 3/2008 | Bogin | ................ | G06F 12/1009 711/202 |
| 10,592,428 B1 * | 3/2020 | Saidi | .................... | G06F 12/0891 |
| 11,687,466 B1 * | 6/2023 | Favor | ................ | G06F 12/1054 711/207 |
| 2004/0143720 A1 * | 7/2004 | Mansell | ............ | G06F 12/1063 711/163 |
| 2005/0160210 A1 * | 7/2005 | Watt | ..................... | G06F 9/4812 710/269 |

(Continued)

*Primary Examiner* — Kenneth M Lo
*Assistant Examiner* — Ryan Dare
(74) *Attorney, Agent, or Firm* — Ladas & Parry, LLP

(57) ABSTRACT

The present disclosure discloses a virtual memory management method and apparatus supporting physical addresses larger than virtual addresses. The method comprises steps of: determining a target virtual address corresponding to an instruction fetch address or a load storage address in any one of a user mode, a supervisor mode, or a machine mode; determining a target physical address corresponding to the target virtual address by accessing a virtual memory management unit, the virtual memory management unit being internally provided with page table entries that map virtual addresses to physical addresses, the bit width of the target virtual address being possibly less than or equal to that of the target physical address, particularly in a many-core application field; and finally, returning the target physical address to a corresponding instruction fetch unit or load memory unit, thereby ensuring the correctness and validity.

11 Claims, 3 Drawing Sheets

(56) References Cited

U.S. PATENT DOCUMENTS

| | | | |
|---|---|---|---|
| 2005/0182903 A1* | 8/2005 | Kinter | G06F 12/1027 |
| | | | 711/144 |
| 2006/0026341 A1* | 2/2006 | Lasser | G06F 12/0246 |
| | | | 711/E12.008 |
| 2006/0206686 A1* | 9/2006 | Banerjee | G06F 12/1027 |
| | | | 711/205 |
| 2012/0011342 A1* | 1/2012 | Ingle | G06F 12/1027 |
| | | | 711/E12.001 |
| 2012/0117301 A1* | 5/2012 | Wingard | G06F 12/1027 |
| | | | 711/6 |
| 2013/0111167 A1* | 5/2013 | Lih | G06F 12/1009 |
| | | | 711/206 |
| 2014/0095784 A1* | 4/2014 | Tran | G06F 12/1027 |
| | | | 711/E12.07 |
| 2014/0331224 A1* | 11/2014 | Robenko | G06F 12/1009 |
| | | | 718/1 |
| 2016/0140050 A1* | 5/2016 | Kujtkowski | G06F 12/1027 |
| | | | 711/108 |
| 2016/0342530 A1* | 11/2016 | Pellerin, III | G06F 12/0895 |
| 2018/0307622 A1* | 10/2018 | Smith | G06F 12/1009 |
| 2019/0188154 A1* | 6/2019 | Basu Roy Chowdhury | |
| | | | G06F 12/1027 |
| 2019/0227802 A1* | 7/2019 | Kessler | G06F 9/3848 |
| 2019/0310948 A1* | 10/2019 | Abhishek Raja | G06F 12/1036 |
| 2019/0377689 A1* | 12/2019 | Tanomoto | G06F 21/604 |
| 2020/0183856 A1* | 6/2020 | Campbell | G06F 12/124 |
| 2020/0218598 A1* | 7/2020 | Xu | G06F 12/10 |

* cited by examiner

VIRTUAL MEMORY MANAGEMENT METHOD AND APPARATUS SUPPORTING PHYSICAL ADDRESSES LARGER THAN VIRTUAL ADDRESSES

CROSS-REFERENCE TO RELATED APPLICATIONS

This application is based on and claims priority to China Patent Application No. 202111509239.8, filed on Dec. 10, 2021, in the China National Intellectual Property Administration, the disclosures of which are incorporated by reference herein in their entirety.

TECHNICAL FIELD

The present disclosure relates to the field of computers technology, and in particular to a virtual memory management method and apparatus supporting physical addresses larger than virtual addresses.

BACKGROUND

Any computer system with certain complexity depends on the cooperation of multiple processes running on the processor. Since each instruction has its own virtual address, it is necessary to convert the virtual address into a physical address.

Although the bit width of virtual address is generally not less than that of physical address in most processor architectures, in some cases, there is the situation that the bit width of virtual address is less than that of physical address. For example, in the RISC-V architecture, in an Sv39 mode (which is a 39-bit page memory management architecture provided by the 64-bit system of the RISC-V structure) and an Sv48 mode (which is a 48-bit page memory management architecture provided by the 64-bit system of the RISC-V structure), the bit width of virtual address is less than that of physical address, so that it is likely to cause system errors or even crashes during the address translation process.

Therefore, how to realize address translation when the bit width of virtual address is less than that of physical address becomes a problem to be solved.

SUMMARY

The present disclosure provides a virtual memory management method and apparatus supporting RISC-V and many-core architectures, in which the translation from a virtual address to a physical address can be performed when the bit width of the virtual address is less than that of the physical address, and the many-core architecture can be ensured to operate effectively in various modes such as user mode, supervisor mode and machine mode, so that the present disclosure has high applicability.

In a first aspect, an embodiment of the present disclosure provides a virtual memory management method, including steps of:
  determining a target virtual address corresponding to an instruction fetch address or a load storage address in any one of a user mode, a supervisor mode, or a machine mode;
  determining a target physical address corresponding to the target virtual address by accessing a virtual memory management unit, the virtual memory management unit stores page table entries that map virtual addresses to physical addresses, the bit width of the target virtual address is less than or equal to that of the target physical address; and
  returning the target physical address.

In a second aspect, an embodiment of the present disclosure provides a virtual memory management apparatus, including:
  an instruction acquisition or load storage module configured to determine a target virtual address corresponding to an instruction fetch address or a load storage address in any one of a user mode, a supervisor mode, or a machine mode;
  a virtual address determination module configured to determine a target physical address corresponding to the target virtual address by accessing a virtual memory management unit, the virtual memory management unit stores page table entries that map virtual addresses to physical addresses, the bit width of the target virtual address is less than or equal to that of the target physical address; and
  an address return module configured to return the target physical address.

In a third aspect, an embodiment of the present disclosure provides an electronic device including a processor and a memory, the processor and the memory being connected to each other;
  the memory is configured to store computer programs; and
  the processor is configured to perform the virtual memory management method provided in the embodiments of the present disclosure when calling the computer programs.

In a fourth aspect, an embodiment of the present disclosure provides a computer-readable storage medium having computer programs stored thereon, the computer programs, when executed by a processor, implement a virtual memory management method provided in the embodiments of the present disclosure.

In a fifth aspect, an embodiment of the present disclosure provides an electronic device including processor and memory, the memory and the processor connect with each other, and the memory is configured to store computer programs, when executed, instructing the processor to: determine a target virtual address corresponding to an instruction fetch address or a load storage address in any one of a user mode, a supervisor mode, or a machine mode; determine a target physical address corresponding to the target virtual address by accessing a virtual memory management unit, the virtual memory management unit stores page table entries that map virtual addresses to physical addresses, the bit width of the target virtual address is less than or equal to that of the target physical address; and return the target physical address.

BRIEF DESCRIPTION OF THE DRAWINGS

In order to explain the technical solutions in the embodiments of the present disclosure more clearly, the drawings to be used in the description of the embodiments will be briefly illustrated below. Apparently, the drawings described hereinafter merely show some of the embodiments of the present disclosure, and those skilled in the art can obtain other drawings according to these drawings without paying any creative effort.

DETAILED DESCRIPTION

The technical solutions of the embodiments of the present disclosure will be described below clearly and completely with reference to the drawings of the embodiments of the present disclosure. Apparently, the described embodiments are some but not all of the embodiments of the present disclosure. All other embodiments obtained by those skilled in the art on the basis of the embodiments of the present disclosure without paying any creative effort shall fall into the protection scope of the present disclosure.

The virtual memory management method supporting RISC-V and many-core architectures provided in the embodiments of the present disclosure is applicable to various central processing units (CPUs), such as A510 CPU and S710 CPU, and can determine a physical address corresponding to a virtual address in an Sv39 mode or Sv48 node of the RISC-V.

Figure 1:
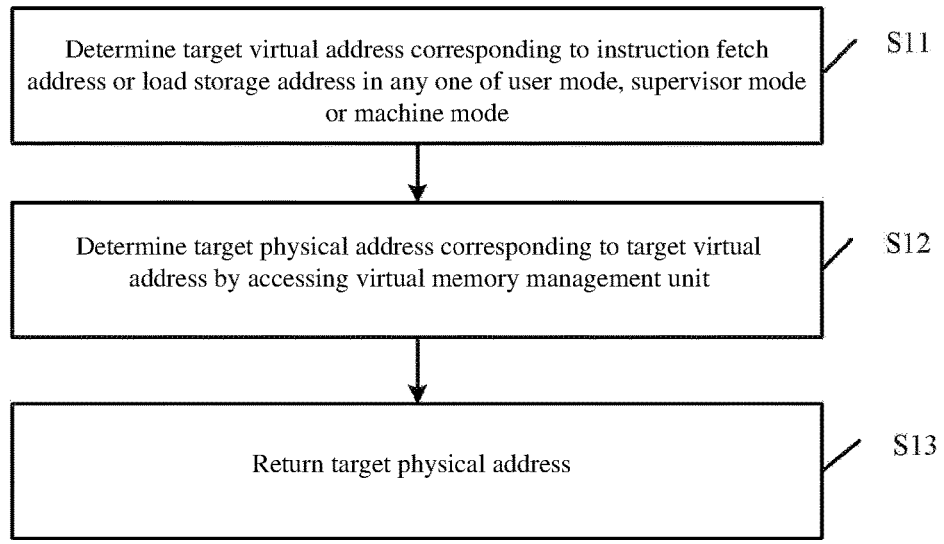
FIG. 1 is a flowchart of a virtual memory management method supporting RISC-V and many-core architectures according to an embodiment of the present disclosure.

With reference to FIG. 1, FIG. 1 is a flowchart of a virtual memory management method supporting RISC-V and many-core architectures according to an embodiment of the present disclosure.

As shown in FIG. 1, the virtual memory management method supporting RISC-V and many-core architectures provided in the embodiment of the present disclosure may include the following steps.

At S1, a target virtual address corresponding to an instruction fetch address or a load storage address in any one of a user mode, a supervisor mode, or a machine mode is determined.

Specifically, the instruction fetch address is an address corresponding to an instruction fetch instruction transmitted by an instruction fetch unit (IFU), and the load storage address is an address corresponding to a load storage instruction transmitted by a load storage unit (LSU). The target virtual address corresponding to the instruction is determined.

The instruction fetch instruction may be an instruction obtained from an Internal Random Access Memory (IRAM) by the instruction fetch unit as desired.

The load storage instruction may be an instruction transmitted by the load storage unit to load or store data of the data storage system. For example, the load storage instruction may be an instruction to load or store data of the DCache storage system.

Further, it is possible to acquire an instruction fetch address or a load storage address in any one of the user mode, the supervisor mode or the machine mode, and then determine a target virtual address corresponding to the acquired instruction fetch address or load storage address.

At S12, a target physical address corresponding to the target virtual address is determined by accessing a virtual memory management unit.

In some feasible implementations, the virtual memory management unit stores page table entries that map virtual addresses to physical addresses. Thus, after the target virtual address is determined, the target physical address corresponding to the target virtual address may be determined based on the page table entries stored in the virtual memory management unit that map virtual addresses to physical addresses.

Any one of the page table entries is used to represent a mapping relationship between the address identifier of one virtual address and the virtual page number (VPN) of the corresponding physical address.

Based on this, during the determination of the target physical address corresponding to the target virtual address, a virtual page number matched with the address identifier corresponding to the target virtual address in each page table entry may be determined, and then the target physical address corresponding to the target virtual address is determined based on the virtual page number. That is, the virtual address is compared with the virtual page in each page table entry. If the corresponding virtual page number is hit, the target physical address corresponding to the target virtual address is determined based on the hit virtual page number.

In some feasible implementations, the virtual memory management unit includes at least one first translation lookaside buffer (TLB) and at least one second TLB. The first TLB may be a Micro-TLB, and the second TLB may be a Joint-TLB.

The first TLB stores page table entries that map virtual addresses to physical addresses within a preset time interval from the current time. That is, the first TLB stores page table entries for determining physical addresses corresponding virtual addresses within a certain time. The second TLB stores page table entries that map all virtual addresses to physical addresses, and the first TLB and the second TLB store page table entries through physical pages.

Specifically, in the user mode or the supervisor mode, that is, when the target virtual address is a virtual address determined in the user mode or the supervisor mode, during the determination of the target physical address corresponding to the target virtual address by accessing the virtual memory management unit, the fully-connected first TLB may be sequentially accessed based on multilevel indexes, so that the target physical address corresponding to the target virtual address is determined based on the page table entries of the first TLB.

If the target physical address corresponding to the target virtual address is not determined based on the page table entries of the first TLB, the second TLB connected to a multipath group is sequentially accessed based on the multilevel indexes, so that the target physical address corresponding to the target virtual address is determined based on the page table entries of the second TLB.

If the target physical address corresponding to the target virtual address is not determined based on the page table entries of the second TLB, the target physical address corresponding to the target virtual address is determined based on a page-table walk mechanism.

If the target physical address corresponding to the target virtual address is determined based on the page table entries of the second TLB or the target physical address corresponding to the target virtual address is determined based on the page-table walk mechanism, the target page table entry corresponding to the target physical address is back-filled to the first TLB.

Figure 2:
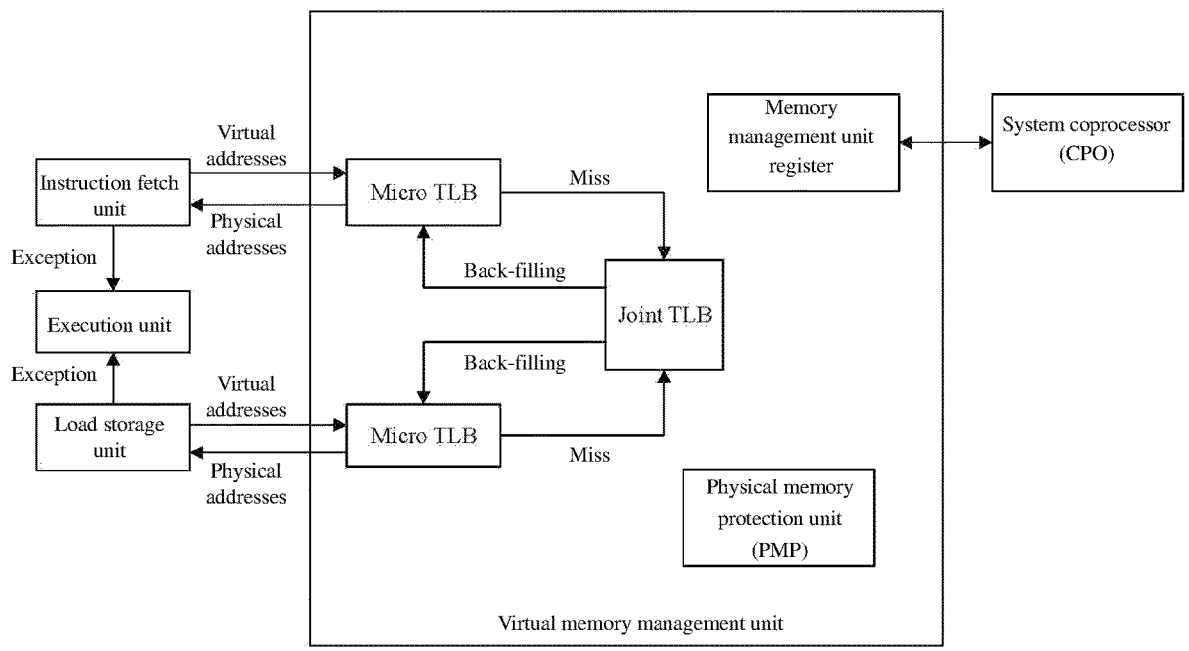
FIG. 2 is a schematic diagram of a scenario of determining a target physical address according to an embodiment of the present disclosure.

With reference to FIG. 2, FIG. 2 is a schematic diagram of a scenario of determining the target physical address according to an embodiment of the present disclosure. FIG. 2 provides a virtual memory management unit, including a plurality of first TLBs (Micro-TLBs) and second TLBs (Joint-TLBs).

After an instruction fetch address corresponding to the instruction transmitted by the instruction fetch unit is acquired and a virtual address (also referred to as a first virtual address hereinafter for convenience of description) of the instruction fetch address is determined, the first TLB of the virtual memory management unit may be accessed, so that the physical address corresponding to the first virtual address is determined based on the page table entries of the first TLB; and, if the physical address corresponding to the first virtual address is hit, the determined physical address is returned to the instruction fetch unit.

If the physical address corresponding to the first virtual address is missed based on the page table entries of the first TLB, the second TLB is accessed so that the physical address corresponding to the first virtual address is determined based on the page table entries of the second TLB. If the physical address corresponding to the first virtual address is hit, the page table entry corresponding to the determined physical address is back-filled to the first TLB, and the physical address is returned to the instruction fetch unit through the first TLB.

If the physical address corresponding to the first virtual address is not determined based on the virtual memory management unit, the page-table walk mechanism is executed based on an execution unit so that the physical address corresponding to the first virtual address is determined.

Similarly, after a load storage address corresponding to the instruction transmitted by the load storage unit is acquired and a virtual address (also referred to as a second virtual address hereinafter for convenience of description) of the load storage address is determined, the second TLB of the virtual memory management unit may be accessed, so that the physical address corresponding to the second virtual address is determined based on the page table entries of the second TLB; and, if the physical address corresponding to the second virtual address is hit, the determined physical address is returned to the instruction fetch unit.

If the physical address corresponding to the second virtual address is missed based on the page table entries of the second TLB, the second TLB is accessed so that the physical address corresponding to the second virtual address is determined based on the page table entries of the second TLB. If the physical address corresponding to the second virtual address is hit, the page table entry corresponding to the determined physical address is back-filled to the second TLB, and the physical address is returned to the instruction fetch unit through the second TLB.

If the physical address corresponding to the second virtual address is not determined based on the virtual memory management unit, the page-table walk mechanism is executed based on the execution unit, so that the physical address corresponding to the second virtual address is determined.

The virtual memory management unit in FIG. 2 further includes a physical memory protection (PMP) unit that specifies the read/write and code execution permission for the physical memory space, for realizing memory access control with low overhead.

The virtual memory management unit in FIG. 2 further includes a virtual memory management unit register connected to an external system coprocessor, for participating in the address translation process.

In some feasible implementations, the multilevel indexes may include Index_4KiB, Index_2MiB and Index_1GiB successively. The Index_4KiB includes 20-bit to 12-bit address identifiers of the target virtual address; the Index_2MiB includes 29-bit to 21-bit address identifiers of the target virtual address; and the Index_1GiB includes 38-bit to 30-bit address identifiers of the target virtual address.

Any one of the page table entries of the first TLB and the second TLB is used to represent a mapping relationship between the address identifier of one virtual address and the virtual page number of the corresponding physical address. That is, each page table entry includes a combination of the address identifier of one virtual address and the virtual page number of the physical address, so that the mapping relationship between this virtual address and this physical address is established.

Specifically, it is possible to access the first TLB based on the Index_4KiB and match the address identifier corresponding to the Index_4KiB with each page table entry of the first TLB. If there is a page table entry including the address identifier corresponding to the Index_4KiB among the page table entries of the first TLB, it may be determined that the page table entries of the first TLB include a first virtual page number matched with the address identifier corresponding to the Index_4KiB, so that the target physical address corresponding to the target virtual address is determined based on the first virtual page number. On the contrary, it may be determined that the target physical address corresponding to the target virtual address cannot be determined based on the Index_4KiB.

When the target physical address corresponding to the target virtual address cannot be determined based on the Index_4KiB, that is, when the page table entries of the first TLB do not include the first virtual page number, it is possible to access the first TLB based on the Index_2MiB and then match the address identifier corresponding to the Index_2MiB with each page table entry of the first TLB. If there is a page table entry including the address identifier corresponding to the Index_2MiB among the page table entries of the first TLB, it may be determined that the page table entries of the first TLB include a second virtual page number matched with the address identifier corresponding to the Index_2MiB, so that the target physical address corresponding to the target virtual address is determined based on the second virtual page number. On the contrary, it may be determined that the target physical address corresponding to the target virtual address cannot be determined based on the Index_2MiB.

When the target physical address corresponding to the target virtual address cannot be determined based on the Index_2MiB, that is, when the page table entries of the first TLB do not include the second virtual page number, it is possible to access the first TLB based on the Index_1GiB and then match the address identifier corresponding to the Index_1GiB with each page table entry of the first TLB. If there is a page table entry including the address identifier corresponding to the Index_1GiB among the page table entries of the first TLB, it may be determined that the page table entries of the first TLB include a third virtual page number matched with the address identifier corresponding to the Index_1GiB, so that the target physical address corresponding to the target virtual address is determined based on the third virtual page number. On the contrary, it may be determined that the target physical address corresponding to the target virtual address cannot be determined based on the Index_1GiB.

When the target physical address cannot be determined by accessing the first TLB based on the multilevel indexes, the second TLB may be further accessed based on the multilevel indexes.

In other words, the second TLB is accessed based on the Index_4KiB, the address identifier corresponding to the Index_4KiB is matched with each page table entry of the second TLB. If there is a page table entry including the address identifier corresponding to the Index_4KiB among the page table entries of the second TLB, it may be determined that the page table entries of the second TLB include a fourth virtual page number matched with the address identifier corresponding to the Index_4KiB, so that the target physical address corresponding to the target virtual address is determined based on the fourth virtual page number. On the contrary, it may be determined that the target physical address corresponding to the target virtual address cannot be determined based on the Index_4KiB.

When the target physical address corresponding to the target virtual address cannot be determined based on the Index_4KiB, that is, when the page table entries of the second TLB do not include the fourth virtual page number, it is possible to access the second TLB based on the Index_2MiB and then match the address identifier corresponding to the Index_2MiB with each page table entry of the second TLB. If there is a page table entry including the address identifier corresponding to the Index_2MiB among the page table entries of the second TLB, it may be determined that the page table entries of the second TLB include a fifth virtual page number matched with the address identifier corresponding to the Index_2MiB, so that the target physical address corresponding to the target virtual address is determined based on the fifth virtual page number. On the contrary, it may be determined that the target physical address corresponding to the target virtual address cannot be determined based on the Index_2MiB.

When the target physical address corresponding to the target virtual address cannot be determined based on the Index_2MiB, that is, when the page table entries of the second TLB do not include the fifth virtual page number, it is possible to access the second TLB based on the Index_1GiB and then match the address identifier corresponding to the Index_1GiB with each page table entry of the second TLB. If there is a page table entry including the address identifier corresponding to the Index_1GiB among the page table entries of the second TLB, it may be determined that the page table entries of the second TLB include a sixth virtual page number matched with the address identifier corresponding to the Index_1GiB, so that the target physical address corresponding to the target virtual address is determined based on the sixth virtual page number. On the contrary, it may be determined that the target physical address corresponding to the target virtual address cannot be determined based on the Index_1GiB.

If the target physical address corresponding to the target virtual address cannot be determined by accessing the second TLB based on the multilevel indexes, the target physical address may be determined based on the page-table walk mechanism.

In the above way, the software-hardware cooperation mechanism can be realized to fill the TLBs, so that the flexibility of the page table structure can be realized and the hardware cost can be reduced.

Figure 3:
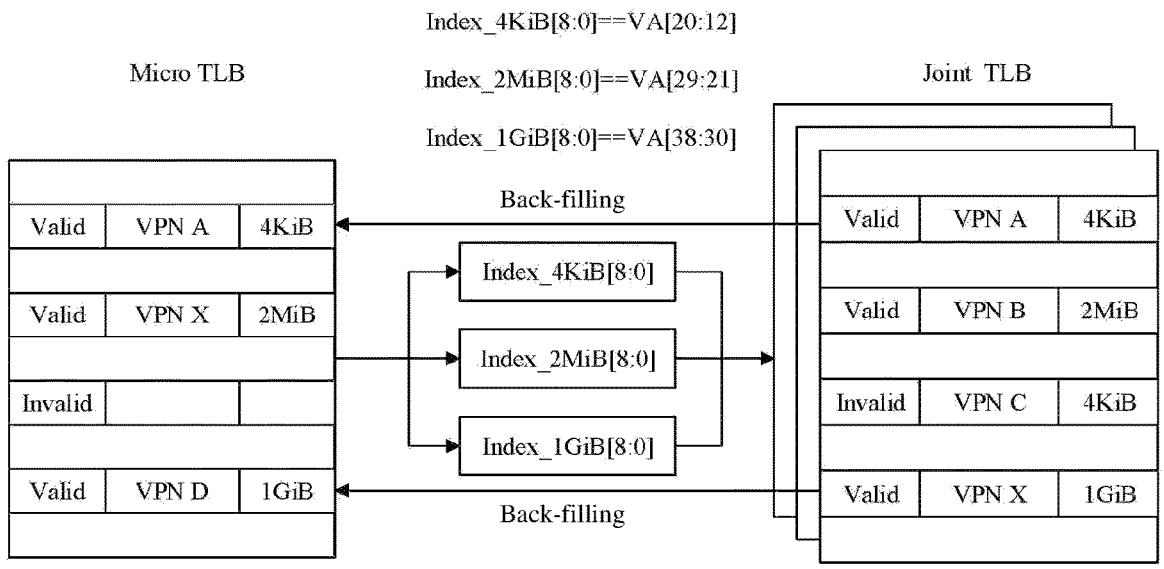
FIG. 3 is a schematic diagram of a scenario of back-filling page table entries according to an embodiment of the present disclosure.

With reference to FIG. 3, FIG. 3 is a schematic diagram of a scenario of back-filling page table entries according to an embodiment of the present disclosure. As shown in FIG. 3, the multilevel indexes include Index_4KiB, Index_2MiB and Index_1GiB successively. Each of the Index_4KiB, Index_2MiB and Index_1GiB includes 8-bit address identifiers, specifically, 20-bit to 12-bit address identifiers, 29-bit to 21-bit addresses identifiers and 38-bit to 30-bit address identifiers of the target virtual address.

When the target physical address corresponding to the target virtual address is not determined based on the first TLB (Micro-TLB), the page table entries of the second TLB (Joint-TLB) may be sequentially accessed based on the multilevel indexes. That is, the valid page table entry corresponding to the Index_4KiB in the second TLB is accessed based on the Index_4KiB. If it is assumed that the page table entry having a virtual page number (VPN) of A is hit based on the Index_4KiB, the target physical address corresponding to the target virtual address is determined based on the VPN A, and the target page table entry including the VPN A is back-filled to the first TLB. When the second TLB is accessed based on the Index_1GiB, the valid page table entry corresponding to the Index_1GiB may be accessed. If it is assumed that the page table entry having a virtual page number (VPN) of X is hit based on the Index_1GiB, the target physical address corresponding to the target virtual address is determined based on the VPN X, and the target page table entry including the VPN X is back-filled to the first TLB.

In some feasible implementations, if the target physical address corresponding to the target virtual address is not determined by accessing the first TLB based on the multilevel indexes, the least recently used physical page for storing page table entries in the first TLB is replaced. Specifically, the least recently used physical page in the first TLB may be determined based on a least recently used (LRU) algorithm.

In some feasible implementations, in the process of determining the target physical address corresponding to the target virtual address by accessing the virtual memory management unit, during reading any page table entry in the virtual memory, parity check may be performed on the page table entry. Each page table entry in the virtual memory management unit needs to be parity encoded when being written.

That is, during any hit page table entry being read, parity check is performed on this page table entry. If the check result includes error information, the error information is reported, and this page table entry is marked as invalid information.

In this case, it is considered that the hit page table entry is not determined, and the target physical address corresponding to the target virtual address may be determined based on the page-table walk mechanism.

Meanwhile, it is also possible to obtain the error information and location information thereof during the determination of the target physical address process (e.g., the error information generated during the parity check process and the corresponding location of the error information) and then repair errors based on the information.

In some feasible implementations, in the machine mode, that is, when the target virtual address is a virtual address determined in the machine mode, a 47-bit to 39-bit extra physical address bit width provided by a configuration register may be acquired, and the extra physical address bit width is transmitted to the virtual memory management unit to construct, based on the extra physical address bit width, a mapping relationship between 0-bit to 47-bit virtual addresses and 0-bit to 47-bit physical addresses. Then, the target physical address corresponding to the target virtual address is determined based on the mapping relationship between virtual addresses and physical addresses stored in the virtual memory management unit by accessing the virtual memory management unit.

Figure 4:
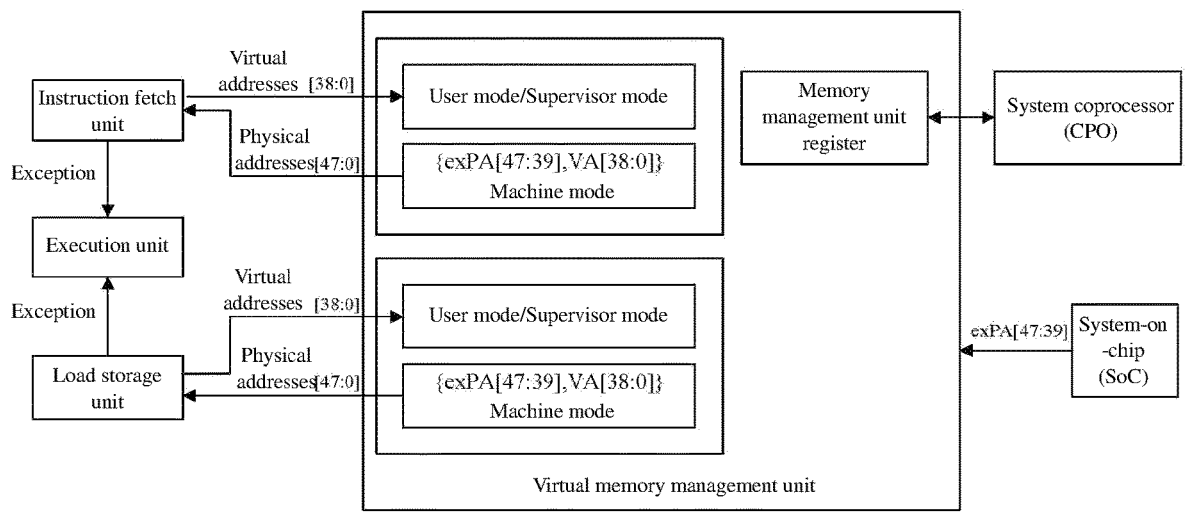
FIG. 4 is a schematic diagram of another scenario of determining a target physical address according to an embodiment of the present disclosure.

With reference to FIG. 4, FIG. 4 is a schematic diagram of another scenario of determining the target physical address according to an embodiment of the present disclosure. FIG. 4 also provides a virtual memory management unit, including related modules for receiving virtual addresses based on the user mode or the supervisor mode and related modules for determining physical addresses based on the machine mode.

The extra physical address bit width exPA[47:39] is provided based on the configuration register in the system-on-chip (SoC) management unit. For the virtual address corresponding to the instruction transmitted by the instruction fetch unit, whose bit width is 39 bits, after the virtual address bit width is spliced with the extra physical address bit width, the mapping relationship IFU_PA[47:0]={exPA[47:39], IFU_VA[38:0]} between 0-bit to 47-bit virtual addresses of the instruction transmitted by the instruction fetch unit and 0-bit to 47-bit physical addresses may be obtained. For the virtual address corresponding to the instruction regarding DCache data transmitted by the load storage unit, the mapping relationship DCache_PA[47:0]=LSU_AG_VA[47:0] between 0-bit to 47-bit virtual addresses of the instruction from the load storage unit and 0-bit to 47-bit physical addresses of the DCache data may also be obtained based on the extra physical address bit width.

The virtual memory management unit in FIG. 4 further includes a virtual memory management unit register connected to an external system coprocessor, for participating in the address translation process.

At S13, the target physical address is returned.

In some feasible implementations, after the target physical address corresponding to the target virtual address is determined, if the target virtual address is the virtual address corresponding to the instruction fetch address, the target physical address is returned to the instruction fetch unit. If the target virtual address is the virtual address corresponding to the load storage address, the target physical address is returned to the load storage unit.

In some feasible implementations, to satisfy the memory management requirements of the operating system to improve the consistency between the virtual memory management unit and the cache, it is also possible to broadcast TLB maintenance information through an interconnect bus, so that the CPU core and other components on the interconnect bus maintain the respective TLBs based on the TLB maintenance information.

The TLB maintenance information may include at least one of a specified address space identifier (ASID), a specified base address of a physical page for storing page table entries and a specified virtual address.

In the present disclosure, the TLB maintenance information may be transmitted to the virtual memory management unit, so that the virtual memory management unit maintains TLBs based on the TLB maintenance information. The above implementations can be executed by hardware without software intervention, so that the page table entries in the TLBs can be maintained to quickly convert virtual addresses to physical addresses.

In the embodiments of the present disclosure, any one of the TLBs in the virtual memory management unit can support 16-bit address space identifiers, so that the overflow time of the address space identifiers of the TLBs is prolonged and the number of refresh times of the TLBs is decreased.

In some feasible implementations, the page table entries in the virtual memory management unit are stored in a physical page, and the corresponding permission verification may be performed when data (e.g., page table entries) is read from the physical page or written into the physical page.

Specifically, if the accessed physical page is a shared page, the physical page is permitted to be accessed. If the accessed physical page is a non-shared page, the physical page is not permitted to be accessed, and an exception prompt is triggered during the physical page being accessed.

It is possible to acquire a field (or flag bit) for representing the sharing attribute of the physical page and then determine, based on the field (or flag bit), whether the physical page is a shared page.

Optionally, if the accessed physical page is in a secure state, that is, the physical page belongs to the trusted world, the physical page is permitted to be accessed. If the accessed physical page is in an insecure state, that is, the physical page belongs to an untrusted worked, the physical page is not permitted to be accessed, and an exception prompt is triggered during the physical page being accessed.

It is possible to acquire a field (or flag bit) for representing that the physical page belongs to a trusted world or an untrusted world and then determine, based on this field (or flag bit), whether the physical page is in a secure state or an insecure state.

Optionally, if the accessed physical page is permitted to be rewritten, it is permitted to write data to the physical page. If the accessed physical page is not permitted to be rewritten, an exception prompt (e.g., a Page Fault exception prompt) is triggered during writing data to the physical page.

It is possible to acquire a field (or flag bit) for representing whether the physical page is permitted to be rewritten and then determine, based on the field (or flag bit), whether the physical page is permitted to be rewritten.

Optionally, if the accessed physical page is permitted to be accessed, it is permitted to access the physical page. If the accessed physical page is not permitted to be accessed, it is not permitted to access the physical page, and an exception prompt (e.g., a Page Fault exception prompt) is triggered during accessing the physical page.

It is possible to acquire a field (or flag bit) for representing whether the physical page is accessible and then determine, based on the field (or flag bit), whether the physical page is permitted to be accessed.

As an example, when the flag bit is 0, it indicates that the physical page is not permitted to be accessed. In this case, the physical page cannot be accessed.

Optionally, a shared process corresponding to the accessed physical page may be determined and then whether a process for accessing the physical page belongs to the shared process corresponding to the physical page may be determined. If the process for accessing the physical page belongs to the shared process corresponding to the physical page, it is permitted to access the physical page; and, if the process for accessing the physical page does not belong to the shared process corresponding to the physical page, it is not permitted to access the physical page, and an exception prompt is triggered during accessing the physical page.

It is possible to acquire a global page identifier field corresponding to the physical page and then determine, based on this field, that the physical page corresponds to a plurality of shared processes.

During determining whether the process for accessing the physical page belongs to the shared process corresponding to the physical page, the determination may be performed through the respective process number (ASID).

Optionally, a first mode and a second mode corresponding to the accessed physical page may be determined. The first mode is an operation mode when the physical page is not permitted to be accessed, the second mode is an operation mode when the physical page is permitted to be accessed, and the second mode is a mode other than the first mode among the user mode, the supervisor mode and the machine mode or a specified mode among the user mode, the supervisor mode and the machine mode, which is not limited here.

If the physical page is accessed in the first mode, an exception prompt is triggered. If the physical page is accessed in the second mode, it is permitted to access the physical page.

As an example, the first mode is the user mode, and the second mode is another mode. If the physical page is accessed in the user mode, an exception prompt is triggered.

It is possible to acquire an access identifier bit (or field) of each operation mode corresponding to the physical page and then determine, based on the access identifier bit (or field) corresponding to each mode, whether the physical page is permitted to be accessed in the corresponding operation mode, so that the first mode and the second mode corresponding to the physical page are obtained.

Optionally, if the accessed physical page has a preset identifier bit in the memory, an exception prompt is triggered during accessing the physical page. If there is no preset identifier bit, it is permitted to access the physical page.

The preset identifier bit is an identifier bit allocated to the physical page in advance in the memory.

Based on the virtual memory management method supporting RISC-V and many-core architectures provided in the embodiments of the present disclosure, the address translation from a virtual address to a physical address can be implemented when the bit width of the virtual address is less than that of the physical address, and the many-core architecture can be ensured to operate effectively in various modes such as user mode, supervisor mode and machine mode, so that the risk of system errors is reduced and the system stability is improved. Moreover, the corresponding permission verification can be performed during accessing data (e.g., page table entries) in the physical page in the virtual memory management unit or writing data to the physical page, so that the system security is further improved.

Figure 5:
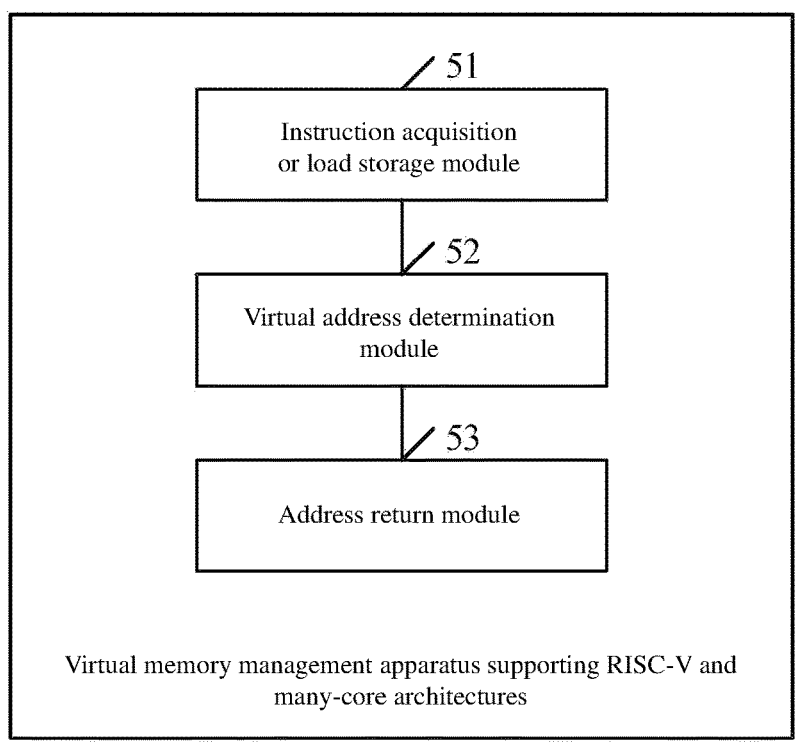
FIG. 5 is a schematic structure diagram of a virtual memory management apparatus supporting RISC-V and many-core architectures according to an embodiment of the present disclosure.

With reference to FIG. 5, FIG. 5 is a schematic structure diagram of a virtual memory management apparatus supporting RISC-V and many-core architectures according to an embodiment of the present disclosure. The apparatus provided in the embodiment of the present disclosure includes:

an instruction acquisition or load storage module 51 configured to determine a target virtual address corresponding to an instruction fetch address or a load storage address in any one of a user mode, a supervisor mode, or a machine mode;

a virtual address determination module 52 configured to determine a target physical address corresponding to the target virtual address by accessing a virtual memory management unit, the virtual memory management unit stores page table entries that map virtual addresses to physical addresses, the bit width of the target virtual address is less than or equal to that of the target physical address; and an address return module 53 configured to return the target physical address.

In some feasible implementations, the virtual memory management unit includes a first translation lookaside buffer and a second translation lookaside buffer, the first translation lookaside buffer stores page table entries that map virtual addresses to physical addresses within a preset time interval from the current time, and the second translation lookaside buffer stores page table entries that map all virtual addresses to physical addresses.

In the user mode or the supervisor mode, the virtual address determination mode 52 is configured to:

sequentially access the first translation lookaside buffer based on multilevel indexes to determine the target physical address corresponding to the target virtual address based on the page table entries of the first translation lookaside buffer;

if the target physical address is not determined, sequentially access the second translation lookaside buffer based on the multilevel indexes to determine the target physical address based on the page table entries of the second translation lookaside buffer; and if the target physical address is not determined, determine the target physical address based on a page-table walk mechanism.

In some feasible implementations, any one of the page table entries is used to represent a mapping relationship between an address identifier of one virtual address and a virtual page number of the corresponding physical address; the multilevel indexes include Index_4KiB, Index_2MiB and Index_1GiB successively; the Index_4KiB includes 20-bit to 12-bit address identifiers of the target virtual address; the Index_2MiB includes 29-bit to 21-bit address identifiers of the target virtual address; and the Index_1GiB includes 38-bit to a 30-bit address identifiers of the target virtual address;

the virtual address determination module 52 is configured to:

access the translation lookaside buffer based on the Index_4KiB, and if the page table entries of the translation lookaside buffer include a first virtual page number matched with the address identifier corresponding to the Index_4KiB, determine the target physical address based on the first virtual page number;

if the page table entries of the translation lookaside buffer do not include the first virtual page number, access the translation lookaside buffer based on the Index_2MiB, and if the page table entries of the translation lookaside buffer include a second virtual page number matched with the address identifier corresponding to the Index_2MiB, determine the target physical address based on the second virtual page number; and if the page table entries of the translation lookaside buffer do not include the second virtual page number, access the translation lookaside buffer based on the Index_1GiB, and if the page table entries of the translation lookaside buffer include a third virtual page number matched with the address identifier corresponding to the Index_1GiB, determine the target physical address based on the third virtual page number.

In some feasible implementations, the virtual address determination module 52 is further configured to:
  if the target physical address is determined based on the page table entries of the second translation lookaside buffer or based on the page-table walk mechanism, back-fill a target page table entry corresponding to the target physical address to the first translation lookaside buffer.

In some feasible implementations, the virtual address determination module 52 is further configured to:
  if the target physical address is not determined based on the page table entries of the first translation lookaside buffer, replace the least recently used physical page for storing page table entries in the first translation lookaside buffer.

In some feasible implementations, in the machine mode, the virtual address determination module 52 is further configured to:
  acquire a 47-bit to 39-bit extra physical address bit width provided by a configuration register;
  transmit the extra physical address bit width to the virtual memory management unit to construct, based on the extra physical address bit width, a mapping relationship between 0-bit to 47-bit virtual addresses and 0-bit to 47-bit physical addresses; and
  determine, by accessing the virtual memory management unit and based on the mapping relationship between virtual addresses and physical addresses stored in the virtual memory management unit, the target physical address corresponding to the target virtual address.

In some feasible implementations, the virtual address determination module 52 is further configured to:
  transmit translation lookaside buffer maintenance information to the virtual memory management unit, so that the virtual memory management unit maintains translation lookaside buffers based on the translation lookaside buffer maintenance information;
  wherein the translation lookaside buffer maintenance information includes at least one of a specified address space identifier, a specified base address of a physical page for storing page table entries and a specified virtual address.

In some feasible implementations, the first translation lookaside buffer and the second translation lookaside buffer support 16-bit address space identifiers.

In some feasible implementations, the page table entries are stored in a physical page in the virtual memory management unit, and the virtual address determination module 52 is further configured to:
  permit to access the physical page if the physical page is a shared page, and trigger an exception prompt during accessing the physical page if the physical page is a non-shared page;
  permit to access the physical page if the physical page is in a secure state, and trigger an exception prompt during accessing the physical page if the physical page is in an insecure state;
  permit to write data to the physical page if the physical page is permitted to be rewritten, and trigger an exception prompt during writing data to the physical page if it is not permitted to write data to the physical page;
  permit to access the physical page if the physical page is permitted to be accessed, and trigger an exception prompt during accessing the physical page if the physical page is not permitted to be accessed;
  permit to access the physical page if an access process for accessing the physical page belongs to a shared process corresponding to the physical page, and not permit to access the physical page if the access process does not belong to the shared process;
  trigger an exception prompt if the physical page is accessed in a first mode, and permit to access the physical page if the physical page is accessed in a second mode, the first mode being a corresponding operation mode when the physical page is not permitted to be accessed, the second mode being a corresponding operation mode when the physical page is permitted to be accessed; and
  trigger an exception prompt during accessing the physical page, if the physical page has a preset identifier bit in the memory.

In some feasible implementations, the virtual address determination module 52 is further configured to:
  when any one of the page table entries is read, perform parity check on the page table entry;
  if the check result includes error information, report the error information, and mark the page table entry as invalid information; and
  determine the target physical address based on the page-table walk mechanism.

In specific implementations, the apparatus may execute the implementations provided by the steps in FIG. 1 through various functional modules disposed in the apparatus, and the details may refer to the implementations provided by the above steps and will not be repeated here.

Figure 6:
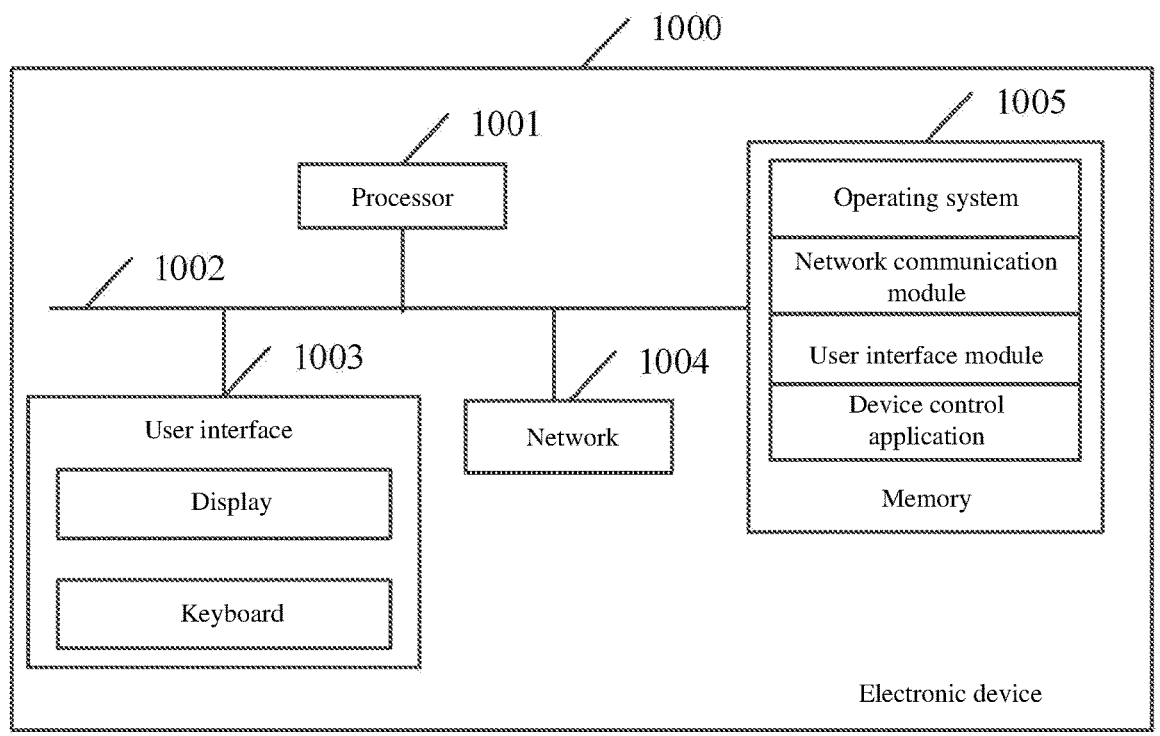
FIG. 6 is a schematic structure diagram of an electronic device according to an embodiment of the present disclosure.

With reference to FIG. 6, FIG. 6 is a schematic structure diagram of an electronic device according to an embodiment of the present application. As shown in FIG. 6, the electronic device 1000 in the embodiment may include: a processor 1001, a network interface 1004 and a memory 1005. In addition, the electronic device 1000 may further include: a user interface 1003 and at least one communication bus 1002. The communication bus 1002 is configured to realize the connection communication among these components. The user interface 1003 may include a display and a keyboard. Optionally, the user interface 1003 may further include a standard wired or wireless interface. The network interface 1004 may optionally include a standard wired or wireless interface (e.g., WI-FI interface). The memory 1004 may be a high-speed RAM memory, or may be a non-volatile memory, e.g., at least one magnetic disk memory. Optionally, the memory 1005 may also be at least one storage device located away from the processor 1001. As shown in FIG. 6, as a computer-readable storage medium, the memory 1005 may include an operating system, a network communication module, a user interface module and a device control application.

In the electronic device 1000 shown in FIG. 6, the network interface 1004 may provide a network communication function; the user interface 1003 is mainly configured to provide an input interface for the user; and, the processor 1001 may be configured to call the device control application stored in the memory 1005 to implement the following:
  determining a target virtual address corresponding to an instruction fetch address or a load storage address in any one of a user mode, a supervisor mode, or a machine mode;
  determining a target physical address corresponding to the target virtual address by accessing a virtual memory management unit, the virtual memory management unit stores page table entries that map virtual addresses to physical addresses, the bit width of the target virtual address is less than or equal to that of the target physical address; and returning the target physical address.

In some feasible implementations, the virtual memory management unit includes a first translation lookaside buffer and a second translation lookaside buffer, the first translation lookaside buffer stores page table entries that map virtual addresses to physical addresses within a preset time interval from the current time, and the second translation lookaside buffer stores page table entries that map all virtual addresses to physical addresses.

In the user mode or the supervisor mode, the processor 1001 is configured to:
sequentially access the first translation lookaside buffer based on multilevel indexes to determine the target physical address corresponding to the target virtual address based on the page table entries of the first translation lookaside buffer;
if the target physical address is not determined, sequentially access the second translation lookaside buffer based on the multilevel indexes to determine the target physical address based on the page table entries of the second translation lookaside buffer; and
if the target physical address is not determined, determine the target physical address based on a page-table walk mechanism.

In some feasible implementations, any one of the page table entries is used to represent a mapping relationship between an address identifier of one virtual address and a virtual page number of the corresponding physical address; the multilevel indexes include Index_4KiB, Index_2MiB and Index_1GiB successively; the Index_4KiB includes 20-bit to 12-bit address identifiers of the target virtual address; the Index_2MiB includes 29-bit to 21-bit address identifiers of the target virtual address; and the Index_1GiB includes 38-bit to a 30-bit address identifiers of the target virtual address;

the processor 1001 is configured to:
access the translation lookaside buffer based on the Index_4KiB, and if the page table entries of the translation lookaside buffer include a first virtual page number matched with the address identifier corresponding to the Index_4KiB, determine the target physical address based on the first virtual page number;
if the page table entries of the translation lookaside buffer do not include the first virtual page number, access the translation lookaside buffer based on the Index_2MiB, and if the page table entries of the translation lookaside buffer include a second virtual page number matched with the address identifier corresponding to the Index_2MiB, determine the target physical address based on the second virtual page number; and
if the page table entries of the translation lookaside buffer do not include the second virtual page number, access the translation lookaside buffer based on the Index_1GiB, and if the page table entries of the translation lookaside buffer include a third virtual page number matched with the address identifier corresponding to the Index_1GiB, determine the target physical address based on the third virtual page number.

In some feasible implementations, the processor 1001 is further configured to:
if the target physical address is determined based on the page table entries of the second translation lookaside buffer or based on the page-table walk mechanism, back-fill a target page table entry corresponding to the target physical address to the first translation lookaside buffer.

In some feasible implementations, the processor 1001 is further configured to:
if the target physical address is not determined based on the page table entries of the first translation lookaside buffer, replace the least recently used physical page for storing page table entries in the first translation lookaside buffer.

In some feasible implementations, in the machine mode, the processor 1001 is configured to:
acquire a 47-bit to 39-bit extra physical address bit width provided by a configuration register;
transmit the extra physical address bit width to the virtual memory management unit to construct, based on the extra physical address bit width, a mapping relationship between 0-bit to 47-bit virtual addresses and 0-bit to 47-bit physical addresses; and
determine, by accessing the virtual memory management unit and based on the mapping relationship between virtual addresses and physical addresses stored in the virtual memory management unit, the target physical address corresponding to the target virtual address.

In some feasible implementations, the processor 1001 is further configured to:
transmit translation lookaside buffer maintenance information to the virtual memory management unit, so that the virtual memory management unit maintains translation lookaside buffers based on the translation lookaside buffer maintenance information;
wherein the translation lookaside buffer maintenance information includes at least one of a specified address space identifier, a specified base address of a physical page for storing page table entries and a specified virtual address.

In some feasible implementations, the first translation lookaside buffer and the second translation lookaside buffer support 16-bit address space identifiers.

In some feasible implementations, the page table entries are stored in a physical page in the virtual memory management unit, and the processor 1001 is further configured to:
permit to access the physical page if the physical page is a shared page, and trigger an exception prompt during accessing the physical page if the physical page is a non-shared page;
permit to access the physical page if the physical page is in a secure state, and trigger an exception prompt during accessing the physical page if the physical page is in an insecure state;
permit to write data to the physical page if the physical page is permitted to be rewritten, and trigger an exception prompt during writing data to the physical page if it is not permitted to write data to the physical page;
permit to access the physical page if the physical page is permitted to be accessed, and trigger an exception prompt during accessing the physical page if the physical page is not permitted to be accessed;
permit to access the physical page if an access process for accessing the physical page belongs to a shared process corresponding to the physical page, and not permit to access the physical page if the access process does not belong to the shared process;
trigger an exception prompt if the physical page is accessed in a first mode, and permit to access the physical page if the physical page is accessed in a second mode, the first mode being a corresponding operation mode when the physical page is not permitted to be accessed, the second mode being a corresponding operation mode when the physical page is permitted to be accessed; and trigger an exception prompt during accessing the physical page, if the physical page has a preset identifier bit in the memory.

In some feasible implementations, the processor 1001 is further configured to:

when any one of the page table entries is read, perform parity check on the page table entry;

if the check result includes error information, report the error information, and mark the page table entry as invalid information; and determine the target physical address based on the page-table walk mechanism.

It should be understood that, in some feasible implementations, the processor 1001 may be a central processing unit (CPU), and the processor may also be other general-purpose processors, digital signal processors (DSPs), application specific integrated circuits (ASICs), field-programmable gate arrays (FPGAs) or other programmable logic devices, discrete gate or transistor logic devices, discrete hardware components, etc. The general-purpose processors may be microprocessors, or the processor may also be any conventional processor, etc. The memory may include ROMs and RAMs, and provides instructions and data to the processor. A part of the memory may further include non-volatile RAMs. For example, the memory may also store information of the device type.

During specific implementations, the electronic device 1000 may execute the implementations provided by the steps in FIG. 1 through various functional modules built in the electronic device, and the details may refer to the implementations provided by the above steps and will not be repeated here.

An embodiment of the present disclosure further provides a computer-readable storage medium having computer programs stored thereon that are executed by a processor to implement the method provided by the steps in FIG. 1. The details may refer to the implementations provided by the above steps and will not be repeated here.

The computer-readable storage medium may be an internal storage unit of the above-described apparatus or electronic device, for example, the hard disk or memory of the electronic device. The computer-readable storage medium may also be an external storage device of the electronic device, for example, a plug-in type hard disk, a smart media card (SMC), a secure digital (SD) card, a flash card, etc. equipped on the electronic device. The computer-readable storage medium may further include magnetic disks, optical disks, ROMs, RAMs, etc. Further, the computer-readable storage medium may further include the internal storage unit of the electronic device or the external storage device. The computer-readable storage medium is configured to store the computer programs and other programs and data required for the electronic device. The computer-readable storage medium may be further configured to temporarily store data that has been output or is to be output.

An embodiment of the present disclosure provides a computer program product or computer program, including computer instructions that are stored in a computer-readable storage medium. A processor of an electronic device reads the computer instructions from the computer-readable storage medium, and the processor executes the computer instructions, so that the computer device executes the method provided by the steps in FIG. 1.

Terms such as "first" and "second" as used in the claims, description and drawings of the present disclosure are used to distinguish similar objects, and are not used to define a particular order. In addition, the terms "include" and "having" and their variants are intended to cover non-exclusive inclusions. For example, a process, method, system, product or electronic device containing a series of steps or units is not limited to the listed steps or units, and may optionally include steps or units that are not listed, or may optionally include other steps or units inherent to the process, method, product or electronic device. The reference to "embodiment" herein means that the specific features, structures or characteristics described with reference to the embodiment may be included in at least one embodiment of the present disclosure. The use of the phase in various places of the description neither necessarily means the same embodiment, nor independent or alternative embodiments that are mutually exclusive with other embodiments. It should be explicitly and implicitly understood by those skilled in the art that the embodiments described herein can be combined with other embodiments. The term "and/or" used in the description and claims of the present disclosure refers to any combination and all possible combinations of one or more of the associated listed items, and includes these combinations.

It should be recognized by one person of ordinary skill in the art that, the units and algorithm steps in the examples described in the embodiments disclosed herein can be implemented by electronic hardware, computer software or combinations thereof. To clearly explain the interchangeability of hardware and software, the components and stores in each example have been generally described in terms of function in the above descriptions. Those skilled in the art can implement the described functions by applying different methods to each particular application, but this implementation should not be deemed as going beyond the scope of the present disclosure.

The above disclosure merely shows the preferred embodiments of the present disclosure and is not intended to limit the patent scope of the present disclosure. Therefore, the equivalent alterations made according to the claims of the present disclosure also belong to the scope of the present disclosure.

What is claimed is:

1. A virtual memory management method, comprising:
    determining a target virtual address corresponding to an instruction fetch address or a load storage address in any one of a user mode, a supervisor mode, or a machine mode;
    determining a target physical address corresponding to the target virtual address by accessing a virtual memory management unit, the virtual memory management unit stores page table entries that map virtual addresses to physical addresses, the bit width of the target virtual address is less than or equal to that of the target physical address; and
    returning the target physical address,
    wherein the virtual memory management unit includes a first translation lookaside buffer and a second translation lookaside buffer, the first translation lookaside buffer stores page table entries that map virtual addresses to physical addresses within a preset time interval from the current time, and the second translation lookaside buffer stores page table entries that map all virtual addresses to physical addresses, wherein in the machine mode, the determining a target physical address corresponding to the target virtual address by accessing a virtual memory management unit comprises:
acquiring a 47-bit to 39-bit extra physical address bit width provided by a configuration register;
transmitting the extra physical address bit width to the virtual memory management unit to construct, based on the extra physical address bit width, a mapping relationship between 0-bit to 47-bit virtual addresses and 0-bit to 47-bit physical addresses; and
determining, by accessing the virtual memory management unit and based on the mapping relationship between virtual addresses and physical addresses stored in the virtual memory management unit, the target physical address corresponding to the target virtual address.

2. The method according to claim 1, wherein
in the user mode or the supervisor mode, the determining a target physical address corresponding to the target virtual address by accessing a virtual memory management unit comprises:
sequentially accessing the first translation lookaside buffer based on multilevel indexes to determine the target physical address corresponding to the target virtual address based on the page table entries of the first translation lookaside buffer;
if the target physical address corresponding to the target virtual address is not determined based on the page table entries of the first translation lookaside buffer, sequentially accessing the second translation lookaside buffer connected to a multipath group based on the multilevel indexes to determine the target physical address corresponding to the target virtual address based on the page table entries of the second translation lookaside buffer; and
if the target physical address corresponding to the target virtual address is not determined based on the page table entries of the second translation lookaside buffer, determining the target physical address corresponding to the target virtual address based on a page-table walk mechanism.

3. The method according to claim 2, wherein any one of the page table entries is used to represent a mapping relationship between an address identifier of one virtual address and a virtual page number of the corresponding physical address; the multilevel indexes comprise Index_4KiB, Index_2MiB and Index_1GiB successively; the Index_4KiB comprises 20-bit to 12-bit address identifiers of the target virtual address, the Index_2MiB comprises 29-bit to 21-bit address identifiers of the target virtual address, and the Index_1GiB comprises 38-bit to 30-bit address identifiers of the target virtual address;
the sequentially accessing any one of the first translation lookaside buffer, or the second translation lookaside buffer based on the multilevel indexes to determine the target physical address corresponding to the target virtual address based on the page table entries of the any one of the first translation lookaside buffer or the second translation lookaside buffer comprises:
accessing the any one of the first translation lookaside buffer or the second translation lookaside buffer based on the Index_4KiB, and if the page table entries of the any one of the first translation lookaside buffer or the second translation lookaside buffer comprise a first virtual page number matched with the address identifier corresponding to the Index_4KiB, determining the target physical address based on the first virtual page number;
if the page table entries of the any one of the first translation lookaside buffer or the second translation lookaside buffer do not comprise the first virtual page number, accessing the any one of the first translation lookaside buffer or the second translation lookaside buffer based on the Index_2MiB, and if the page table entries of the any one of the first translation lookaside buffer or the second translation lookaside buffer comprise a second virtual page number matched with the address identifier corresponding to the Index_2MiB, determining the target physical address based on the second virtual page number; and
if the page table entries of the any one of the first translation lookaside buffer or the second translation lookaside buffer do not comprise the second virtual page number, accessing the any one of the first translation lookaside buffer or the second translation lookaside buffer based on the Index_1GiB, and if the page table entries of the any one of the first translation lookaside buffer or the second translation lookaside buffer comprise a third virtual page number matched with the address identifier corresponding to the Index_1GiB, determining the target physical address based on the third virtual page number.

4. The method according to claim 2, further comprising:
if the target physical address is determined based on the page table entries of the second translation lookaside buffer or based on the page-table walk mechanism, back-filling a target page table entry corresponding to the target physical address to the first translation lookaside buffer.

5. The method according to claim 2, further comprising:
if the target physical address is not determined based on the page table entries of the first translation lookaside buffer, replacing the least recently used physical page for storing page table entries in the first translation lookaside buffer.

6. The method according to claim 2, further comprising:
transmitting translation lookaside buffer maintenance information to the virtual memory management unit, so that the virtual memory management unit maintains translation lookaside buffers based on the translation lookaside buffer maintenance information;
wherein the translation lookaside buffer maintenance information comprises at least one of a specified address space identifier, a specified base address of a physical page for storing page table entries and a specified virtual address.

7. The method according to claim 2, wherein the first translation lookaside buffer and the second translation lookaside buffer support 16-bit address space identifiers.

8. The method according to claim 2, further comprising:
when any one of the page table entries is read, performing parity check on the page table entry;
if the check result comprises error information, reporting the error information, and marking the page table entry as invalid information; and
determining the target physical address based on the page-table walk mechanism.

9. The method according to claim 1, wherein the page table entries are stored in a physical page in the virtual memory management unit, and the method further comprises at least one of the following:

permitting to access the physical page if the physical page is a shared page, and triggering an exception prompt during accessing the physical page if the physical page is a non-shared page;

permitting to access the physical page if the physical page is in a secure state, and triggering an exception prompt during accessing the physical page if the physical page is in an insecure state;

permitting to write data to the physical page if the physical page is permitted to be rewritten, and triggering an exception prompt during writing data to the physical page if it is not permitted to write data to the physical page;

permitting to access the physical page if the physical page is permitted to be accessed, and triggering an exception prompt during accessing the physical page if the physical page is not permitted to be accessed;

permitting to access the physical page if an access process for accessing the physical page belongs to a shared process corresponding to the physical page, and not permitting to access the physical page if the access process does not belong to the shared process;

triggering an exception prompt if the physical page is accessed in a first mode, and permitting to access the physical page if the physical page is accessed in a second mode, the first mode being a corresponding operation mode when the physical page is not permitted to be accessed, the second mode being a corresponding operation mode when the physical page is permitted to be accessed; and if the physical page has a preset identifier bit in the memory, triggering an exception prompt during accessing the physical page.

10. An electronic device, comprising:

a processor; and a memory, the memory and the processor being connected to each other;

the memory is configured to store computer programs, when executed, instructing the processor to:

determine a target virtual address corresponding to an instruction fetch address or a load storage address in any one of a user mode, a supervisor mode, or a machine mode;

determine a target physical address corresponding to the target virtual address by accessing a virtual memory management unit, wherein the virtual memory management unit stores page table entries that map virtual addresses to physical addresses, the bit width of the target virtual address is less than or equal to that of the target physical address; and return the target physical address, wherein the virtual memory management unit includes a first translation lookaside buffer and a second translation lookaside buffer, the first translation lookaside buffer stores page table entries that map virtual addresses to physical addresses within a preset time interval from the current time, and the second translation lookaside buffer stores page table entries that map all virtual addresses to physical addresses, wherein in the machine mode, the determining a target physical address corresponding to the target virtual address by accessing a virtual memory management unit comprises:

acquiring a 47-bit to 39-bit extra physical address bit width provided by a configuration register;

transmitting the extra physical address bit width to the virtual memory management unit to construct, based on the extra physical address bit width, a mapping relationship between 0-bit to 47-bit virtual addresses and 0-bit to 47-bit physical addresses; and determining, by accessing the virtual memory management unit and based on the mapping relationship between virtual addresses and physical addresses stored in the virtual memory management unit, the target physical address corresponding to the target virtual address.

11. A non-transitory computer-readable storage medium having computer programs stored thereon that are executed by a processor to implement the method according to claim 1.

* * * * *